July 1, 1941.　　　F. C. BEST　　　2,247,742
MOTOR VEHICLE
Filed Jan. 21, 1939　　　3 Sheets-Sheet 1

INVENTOR.
Frank C. Best
BY Tibbetts & Hart
ATTORNEYS

July 1, 1941.  F. C. BEST  2,247,742
MOTOR VEHICLE
Filed Jan. 21, 1939  3 Sheets-Sheet 2
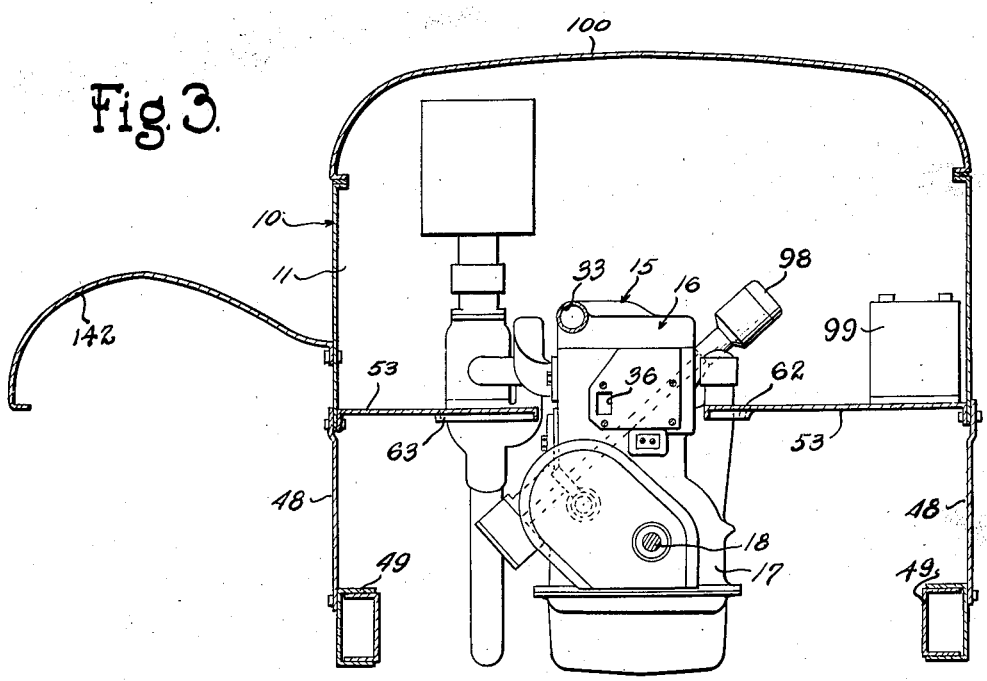
Fig. 3.
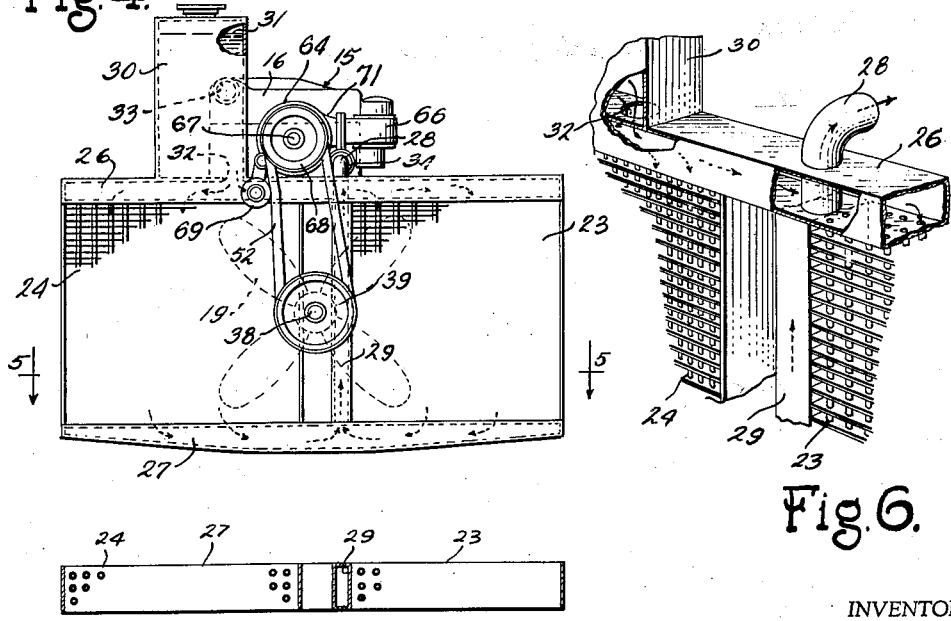
Fig. 4.
Fig. 5.
Fig. 6.
INVENTOR.
Frank C. Best
BY Tibbetts & Hart
ATTORNEYS

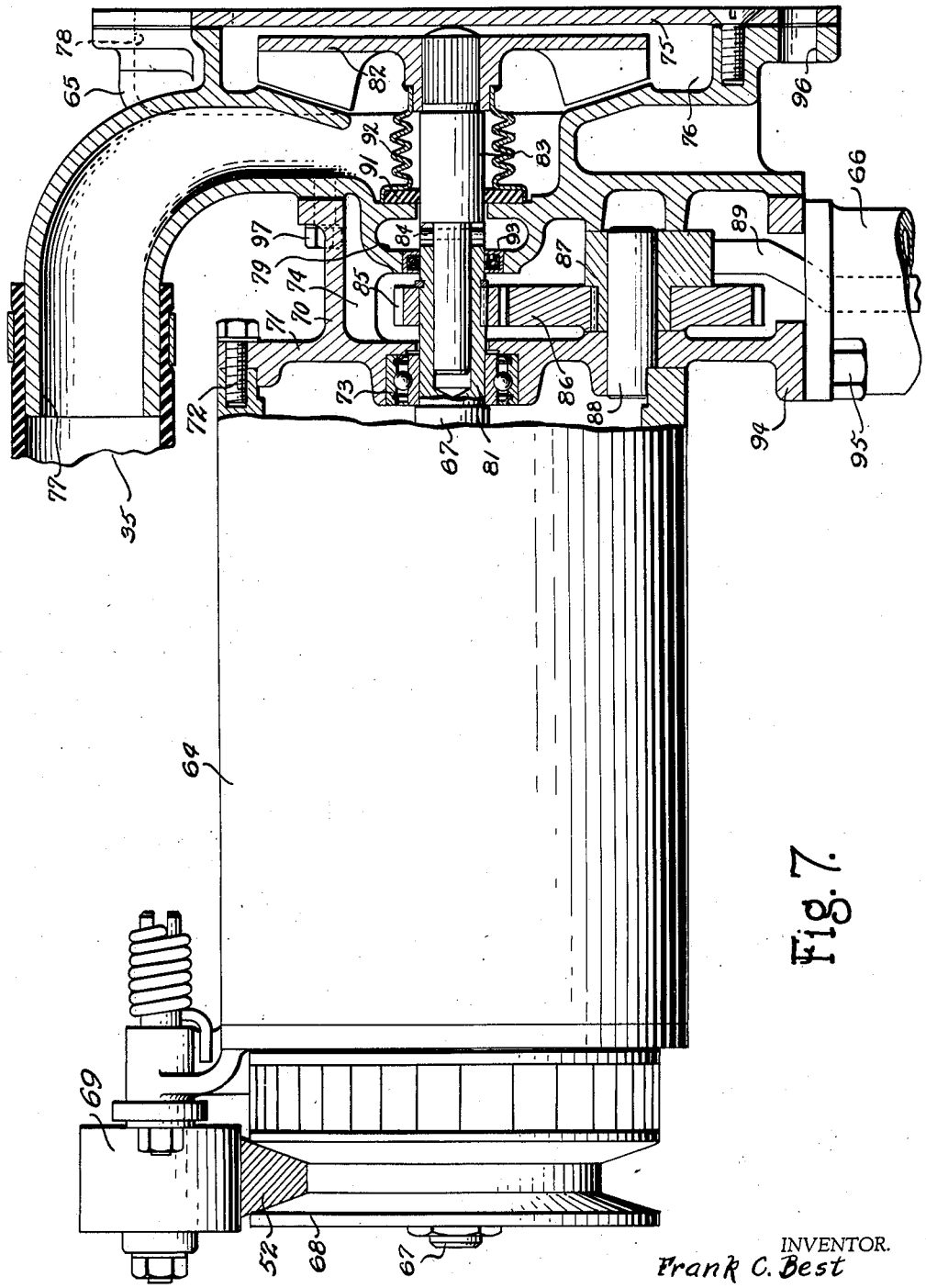

Patented July 1, 1941

2,247,742

UNITED STATES PATENT OFFICE 2,247,742

MOTOR VEHICLE

Frank C. Best, Detroit, Mich., assignor to Packard Motor Car Company, Detroit, Mich., a corporation of Michigan Application January 21, 1939, Serial No. 252,138

12 Claims. (Cl. 180—54)

This invention relates generally to motor vehicles and more particularly to engine cooling and the arrangement of accessories in such connection.

In an effort to establish a low center of gravity for vehicles, the engine and likewise the fluid cooling radiator therefor has been considerably lowered. A present trend in body styling is intended to take advantage of this fact by placing a major portion of the radiator cooling air inlet at a relatively low level in the vehicle structure and extending the grill-work thereof laterally into the wheel fender supporting structures and in some cases into the fenders themselves.

The present invention contemplates and includes among its objects the provision, in a motor vehicle of the above general character, of means for improving the circulation of cooling air through the radiator and the ventilation and cooling of the engine compartment.

Another object of the invention resides in the provision of a fluid cooling radiator for motor vehicles arranged to cooperate with the engine parts and accessories in a manner to permit relatively low positioning thereof, resulting in a compact and space-saving assembly.

It is also an object of the invention to provide a new grouping and arrangement of engine driven accessories resulting in a more economical installation and permitting of easy access to the parts.

The invention has for another object an improved unitary arrangement of the electrical current generator, fluid circulating pump, fuel pump, and means for driving these accessories from the engine.

Other objects and advantages of the invention will become apparent from the following description taken in connection with the accompanying drawings in which:

Fig. 1 is a front elevational view of a motor vehicle embodying the present invention;

Fig. 2 is a side view partially in section of the vehicle engine compartment and its contents;

Fig. 3 is a view partially in section and partially in elevation taken substantially along the line 3—3 of Fig. 2;

Fig. 4 is a front elevational view taken substantially along the line 4—4 of Fig. 2 and showing principally the fluid cooling radiator of the present invention;

Fig. 5 is a sectional view taken substantially on the line 5—5 of Fig. 4;

Fig. 6 is a fragmentary perspective view of the fluid cooling radiator shown in Figs. 2, 4 and 5, and Fig. 7 is a top view partially in horizontal section, showing the electrical current generator, water pump and driving connections from the generator to the fuel pump.

Referring to the drawings, reference numeral 10 indicates a motor vehicle having a front engine compartment 11 and a body 12 forming a passenger carrying compartment, the body including dash 13 and an inclined toe board 14.

In the present instance, the engine 15, including the usual cylinder block 16, has conventional cooling fluid passages therein (not shown), a crank case 17, crank shaft 18, and a cooling fan 19 mounted thereon. The engine is positioned in the compartment 11 forwardly of the body compartment 12 and inclined slightly rearwardly with its center of gravity positioned well below the vertical center of the vehicle. The engine may be mounted to oscillate upon the vehicle framing in any suitable and well known manner (not shown) and the engine crank shaft 18 may be connected in the usual manner to a clutch in housing 21 and change speed mechanism in housing 22 which housings may extend below and to the rear of the toe board 14.

In order to permit the fluid cooling radiator to be positioned as low as possible in the vehicle and at the same time to provide adequate cooling capacity, a new construction and arrangement of parts is provided by the invention.

The radiator comprises a pair of separate cores 23 and 24 arranged transversely of the vehicle and positioned end to end, but in spaced relation to each other, one on each side of the center line of the crank shaft 18. In the present instance the core portions are mounted forwardly of the engine upon brackets 25 carried by a transverse vehicle frame member 20. The cores 23 and 24 are connected by common upper and lower hollow headers 26 and 27 respectively, the lower header 27 being connected to the outlet 28 by a vertical conduit 29 extending through, but not in open communication with the upper header 26.

In the present instance the water level in the radiator cores 23 and 24 is somewhat lower than that in the engine cylinder block. To provide adequate water circulation, an auxiliary tank or reservoir 30 is suitably mounted above the upper header 26 and is of such height as to provide a water level 31 above that of the cylinder block. The tank is in open communication with the upper header through an opening 32. The fluid outlet 33 at the upper portion of the cylinder block 16 is connected by a flexible conduit 34 with the interior of the reservoir tank 30 and the radiator fluid outlet 28 is connected by a flexible hose 35 with the cylinder block inlet opening 36. Thus hot fluid from the upper cylinder block may pass into tank 30 and will then circulate through the upper header 26, both cores 23 and 24 and the lower header 27, the cooled water being returned to the engine through return conduit 29 and outlet 28 aided by a fluid circulating pump to be later described.

Due to the above radiator construction and arrangement, it is possible to extend the radiating cores 23 and 24 well below the crank shaft center line, thus materially lowering the vertical position of the radiator structure within the engine compartment. Because of the spaced arrangement of the cores, it is possible to extend the crank shaft forward end 38 therebetween without interference to the front side thereof so that an engine accessory driving member, such as a belt pulley 39, can be fixed thereto.

To provide for an adequate supply of cooling air to the radiator cores 23 and 24, and at the same time to enhance the appearance of the vehicle, a series of horizontal air inlet slots 41 are formed in the inner portion or "cat-walk" 42 of each fender 142. Such slots cover an area from the lower edges of the fender inner portions to a point substantially in the plane of the tops of the radiator cooling cores 23 and 24 and they extend transversely from near the inner edges of the fenders to points well toward the outer edges. These series of air inlet slots 41 may each be covered with decorative grill-work 44. In the present instance the vehicle headlights 45 are placed in the fenders and shaped to carry out the same design as that of the grill-work.

To provide an additional supply of air for aiding in cooling and ventilating the engine compartment, openings and grill-work 47 may extend between and upwardly above the series of openings 41 to a point above the top of the radiator cores 23 and 24.

For controlling the cooling and ventilating air entering the engine compartment so that an adequate supply is available to the radiator cores 23 and 24 and a sufficient quantity is available for ventilating the engine compartment, the entire engine compartment 11 is divided into upper and lower portions by a substantially horizontally extending partition extending between the engine and the body walls forming the engine compartment.

The partition comprises in part, a transverse air directing baffle 51 suitably secured to and extending between the fender structures 42 interiorly of and across the front end of the engine compartment, approximately in the plane of the top of the radiator and extending rearwardly to a point closely adjacent the radiator cores, but sufficiently spaced therefrom to provide an opening for an engine accessory driving belt 52 to pass upwardly therethrough. The remainder of the partition comprises a pair of similar horizontal, air directing baffles 53, positioned one on each side of the engine, secured along their forward edges to the upper header 26 of the radiator cores as at 54 and extending rearwardly to a point 55 adjacent but in spaced relation to the toe board 14 of the passenger compartment 12. From this point, the rear edges 60 of the baffles 53 extend downwardly in an inclined plane, substantially parallel and in spaced relation to the toe board 14, and terminate well to the rear of the juncture 56 between the dash 13 and toe board 14, forming a restricted air duct 57, which, due to differential air pressures, will act to evacuate air from both the upper and lower portions of the engine compartment, when the vehicle is in motion. The rear edges of these baffles 53 may be suitably supported as by brackets 58 extending from the dash 13 to the upper faces of the baffles and the outer side edges may be flanged and secured to the side pans 48 of the engine compartment, which in turn, are removably carried by the side frame members 49. Due to the above construction and arrangement, air turbulence in the engine compartment, heretofore present, has been materially reduced with a resultant reduction in noise and heat transfer through the dash into the passenger compartment.

To insure an adequate supply of cooling and ventilating air to the upper portion of the engine compartment, the baffles 53 may be formed with cut-out portions above and slightly to the rear of the cooling fan 19, forming downwardly extending lips 59 inclined toward the rear side of the fan 19 and an opening 61 through which air from the fan 19 will be directed by the baffle lip 59 above the partition to the upper engine compartment. The baffles 53 are also provided with various other cut-out portions such as at 62 and 63 to avoid interfering parts.

Inasmuch as the engine is intended to oscillate slightly upon its axis, it is preferable to position the baffles 51 and 53 as closely as possible to the plane of the axis of oscillation of the engine. By this provision, the inner edges of the baffles 53 may be brought very close to the sides of the engine.

Cooling air entering the series of slots 41 will be directed by the baffle 51 to the cooling radiator cores 23 and 24 and induced therethrough by the cooling fan 19, a portion of the air from the fan being directed by the baffle lip 59 through the opening 61 to the upper section of the engine compartment and a portion flowing along the sides of the engine below the baffles 53 and within the lower section of the engine compartment. Air entering through the grill-work 47 above the horizontal partition will pass into the upper engine compartment, cooling and ventilating the same. Due to the cooperative arrangement of the rear lips 60 of the baffles 53 and the toe board 14, air will be evacuated by a Venturi action from both the upper and lower engine compartments when the vehicle is in motion.

It will be noted that with the construction and arrangement of parts as thus far described, the radiator cores and the horizontal partition are positioned entirely below the vehicle vertical center line, aiding in effecting a low center of gravity for the vehicle as a whole and permitting wide latitude in body styling.

With the present construction it is desirable that the engine accessories requiring more or less frequent attention be located in a comparatively accessible manner. Thus with the efficiency, accessibility and compactness of such accessories in mind the invention provides a unitary accessory group comprising an electrical current generator 64, a cooling fluid circulating pump 65, a liquid fuel and vacuum pump 66, and connecting driving mechanism therebetween positioned above the radiator cores 23 and 24 carried as a unit by the engine and connected through a common drive to the engine crank shaft.

The drive shaft 67 of the generator 64 constitutes a common drive shaft for all the above accessories and is provided with a belt pulley 68 at one end thereof outside the generator casing which, in turn, is positioned in alignment above the driving pulley 39 of the crank shaft extension 38 below the horizontal partitions 51 and 53 to be driven by the belt 52. Since the generator is in a fixed position, a belt-tensioning device 69 of any suitable well known character may be employed.

The rear cover plate 71 of the generator may be removably secured to the casing as at 72 and provided centrally with a bearing 73 to receive the rear end of the generator shaft 67. The cover plate 71 is formed with rearwardly extending flanges 70 to provide a housing 74 outside the generator casing and to the rear thereof. The cover plate 71 is also formed with radial flanges 94 to which the fuel pump 66 may be secured as at 95.

The fluid circulating pump 65 comprises a casting having a face plate 75, a pump cavity 76, inlet and outlet passageways 77 and 78 respectively and a fluid drain 79. The side of the pump casing opposite the face plate 75 is formed to abut the flanges 70 of the generator cover plate 71 completing the housing enclosure 74 and positioning the fluid drain opening 79 within the housing.

To provide driving power for the circulating and fuel pumps, the generator drive shaft 67 is formed with an extension 81 exteriorly of the generator casing and terminating within the housing 74. Fluid impeller blades 82 are mounted in the pump cavity 76, and connected to be driven by the generator shaft extension 81 through pin 84 is a pump shaft 83.

For driving the liquid fuel and vacuum pump mechanism 66, a pinion 85 is mounted on the generator shaft extension 81 in housing 74 and is in constant mesh with a reduction gear 86 mounted upon a sleeve. Cam 87 is rotatably mounted upon a stub shaft 88 carried by the rear cover 71 of the generator casing and is connected to actuate the fuel pump 66 through an intermediate cam follower drive 89.

Suitable means for sealing the circulating pump chamber and the gear housing 74 may be provided, such as a gasket 91 and flexible bellows 92 between the pump chamber and the liquid drain 79 and a sealing gasket 93 between the gear chamber 74 and the drain 79. Leakage of either lubricating oil from the gear chamber or water from the pump cavity will be caught and drained through the drain opening 79.

Thus the accessory unit may be assembled by securing the face plate 75 of the circulating pump to the engine block as at 96. The flanges 70 of the generator cover plate 71 may be secured to the circulating pump casting as at 97 after the shafts 83 and 81 have been connected, the fuel pump 66 may be secured to the flanges 94 of the cover plate 71 as at 95 and the generator proper 64 may be secured to its cover plate 71 as at 72.

As shown in Fig. 3, the distributor 98 also extends above the horizontal partition and the storage battery 99 may be suitably carried by one of the baffles 53 to be cooled by the air passing through the engine compartment. Thus it will be seen that access may be easily had to all accessories in the upper section of the engine compartment by raising the hinged cover 100. Due to the construction and arrangement of the various parts as above described, a very compact, efficient and economical assembly is provided.

It will be obvious to those skilled in the art that various modifications in construction and design may be made without departing from the spirit or scope of the invention, which is to be limited only by the appended claims.

What is claimed is:

1. In a motor vehicle having a compartment, an engine mounted within said compartment, a fluid cooling radiator for said engine comprising a pair of transversely spaced radiating cores, fluid connections between said cores and said engine, a crank shaft having a forward end projecting between and in advance of said cores, a horizontal partition substantially dividing said engine compartment into upper and lower portions, an engine accessory mounted above said partition, and means extending above and below said partition and connecting said accessory to be driven from said crank shaft in advance of said cores.

2. In a motor vehicle having a compartment, an engine including a crank shaft mounted within said compartment, an engine accessory driving member connected to be driven by said crank shaft, a partition above said accessory driving member and positioned to substantially divide said engine compartment into upper and lower portions, a fluid cooling radiator connected to said engine and positioned below said partition, an engine driven accessory mounted above said cooling radiator and above said partition, and means connecting said accessory to be driven by said accessory driving member.

3. In a motor vehicle having a compartment, an engine mounted within said compartment having a crank case and a crank shaft extension outside the crank case, an engine accessory driving pulley on said extension, a horizontal partition positioned above said accessory driving pulley and substantially dividing said engine compartment into upper and lower portions, a fluid cooling radiator connected to said engine having core portions positioned one on each side of said crank shaft extension and between said accessory driving pulley and said crank case, an engine accessory mounted above said cooling radiator and having a pulley in alignment with said accessory driving pulley, and driving means extending through said partition and connecting said pulleys.

4. In a motor vehicle, a compartment having a wall provided with spaced openings, an engine in said compartment, a radiator in the compartment connected with the engine and located between the engine and the openings, and a baffle in the compartment extending horizontally across the upper extremities of the openings, and the space therebetween and between said compartment wall and the upper portion of the radiator.

5. In a motor vehicle, a compartment having a dash and toe board forming the rear wall thereof, said compartment having air inlets and outlets, an engine in said compartment, and horizontal air directing baffles positioned below the vehicle vertical center line and extending substantially from the sides of the engine to the side walls of said compartment and from a point adjacent the air inlet openings to a point below and to the rear of the forward edge of said toe board.

6. In a motor vehicle having a compartment and provided with air inlets, an engine in said compartment, a cooling radiator for said engine in said compartment, and longitudinally extending baffles dividing the compartment horizontally into upper and lower portions, said cooling radiator being positioned entirely below said baffles.

7. In a motor vehicle having a compartment provided with air inlet openings, an engine in said compartment, a cooling radiator in said compartment, a cooling fan for said engine in said compartment, division means in said compartment forming upper and lower compartment portions, said radiator and fan being disposed in the lower compartment portion, and means associated with said fan and said division means for directing a portion of the air from said fan to the upper portion of said compartment.

8. In a motor vehicle, a compartment extending rearwardly partly beneath the toe board, said compartment having front and rear air inlet and outlet openings, an engine in said compartment, means dividing the compartment into upper and lower portions, baffle means directing a portion of the air from the air inlet openings to the upper portion of said compartment, and means associated with said baffle and said toe board for causing the evacuation of air from the upper portion of said engine compartment.

9. In an engine having a crank case and a crank shaft provided with an extension outside the crank case, an engine accessory drive pulley on said crank shaft extension in spaced relation to said crank case, a fluid cooling radiator for said engine positioned between said accessory drive pulley and said engine and having an opening therethrough to receive said crank shaft extension, an engine accessory mounted above said radiator and provided with a driven pulley in alignment with said accessory drive pulley, and a driving connection between said pulleys.

10. In a motor vehicle having a compartment, an engine in said compartment, a substantially horizontally extending partition dividing said compartment into upper and lower portions, an engine accessory positioned above said partition, accessory driving means below said partition, and a driving connection extending through said partition between said driving means and said accessory.

11. In a motor vehicle having a compartment, an engine in said compartment, a substantially horizontally extending partition dividing said compartment into upper and lower portions, engine accessory driving means below said partition, engine accessories comprising an electrical current generator and a fluid circulating pump mounted above said partition, a common drive shaft for said generator and pump, and driving connections between said accessory driving means and said shaft.

12. In a motor vehicle, an engine casing having air inlet openings, an engine positioned within said casing mostly below the vehicle vertical center line, a fluid cooling radiator for said engine positioned mostly below the vertical center line of the vehicle, and horizontal air directing baffles extending from said air inlet openings substantially to the top of said radiator and along the sides of said engine to the end thereof.

FRANK C. BEST.